United States Patent [19]

South

[11] Patent Number: 5,365,880
[45] Date of Patent: Nov. 22, 1994

[54] GROOMING AND DISPENSING BRUSH

[76] Inventor: Judith M. South, P.O. Box 1273, Yulee, Fla. 32097

[21] Appl. No.: 227,735

[22] Filed: Apr. 14, 1994

[51] Int. Cl.$^5$ ............ A01K 31/00; A45D 24/22; A46B 11/00
[52] U.S. Cl. .................. 119/85; 119/91; 132/116; 132/120; 401/281; 401/287
[58] Field of Search .......... 119/91, 94, 83, 86, 119/85, 156, 159; 401/287, 274, 281; 132/112, 116, 120

[56] References Cited

U.S. PATENT DOCUMENTS

| | | | |
|---|---|---|---|
| 2,336,917 | 12/1943 | Crimmons | 132/120 |
| 2,507,373 | 5/1950 | Finkelstein | 132/120 |
| 2,565,889 | 8/1951 | Schroer | 119/159 |
| 2,897,826 | 8/1959 | Vito | 132/116 |
| 4,044,724 | 8/1977 | Merchill | 119/83 |
| 4,090,522 | 5/1978 | Donley et al. | 132/112 |
| 4,183,328 | 1/1980 | Lawrence | 132/112 |
| 4,213,423 | 7/1980 | Bryan et al. | 119/86 |
| 4,237,822 | 12/1980 | Kaiser, Jr. | 119/85 |
| 4,277,193 | 7/1981 | Knaus | 132/120 |
| 4,617,875 | 10/1986 | Holland | 119/85 |
| 4,958,596 | 9/1990 | Belan | 119/83 |
| 5,056,480 | 10/1991 | Murray, Sr. | 401/274 |

*Primary Examiner*—Paul J. Hirsch
*Attorney, Agent, or Firm*—Rhodes & Ascolillo

[57] ABSTRACT

A pesticide dispensing and grooming brush has an inner tubular wall. The inner tubular wall has a plurality of first ports through the inner tubular wall. The inner tubular wall also forms an open-ended chamber to hold and dispense a pesticide or other animal care product. A locking filler cap is unlockingly secured to a filler end of the inner tubular wall. The locking filler cap has a disc and locking lugs attached to the disc. An actuation lug is attached to a top surface of the disc to assist in turning the disc and to provide access to the first chamber. An outer tubular wall rotatingly surrounds the inner tubular wall. A plurality of second ports extend through the outer tubular wall. A plurality of bristles is attached to and extends outwardly from the outer tubular wall. A handle has a swivel member. A lower surface of the swivel member is attached to one end of the handle. The swivel member is swivelly connected to a swivel end of the inner tubular wall. A plurality of threads on the one end of the handle is immediately below the swivel member. An anti-rotational cap is threadingly connected to a handle end of the outer tubular wall. The anti-rotational cap has a threaded handle port, in a cap wall of the anti-rotational cap through which the plurality of threads on one end of the handle is threaded.

3 Claims, 2 Drawing Sheets

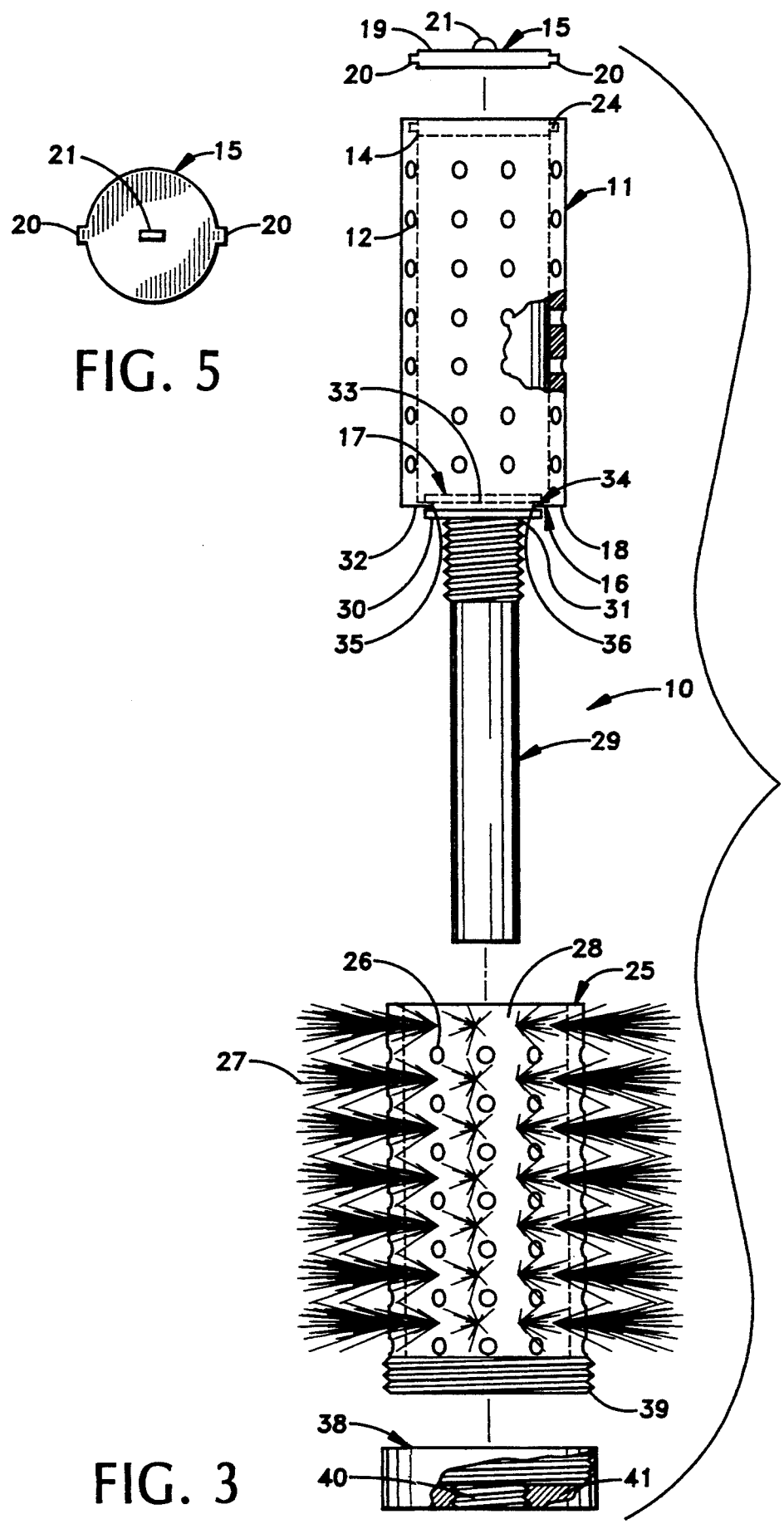

GROOMING AND DISPENSING BRUSH

BACKGROUND OF THE INVENTION

1. Field of the Invention

This invention relates in general to a grooming and pesticidal powder applicator brush and more specifically to a grooming and pesticidal powder applicator brush for animals.

2. Description of the Related Art

Many devices have been offered to work pesticides such as flea powder into the fur or pelt of a domestic animal such as a dog or cat to combat fleas and other parasitic pests. The sound of aerosols scare most animals and creams have to be rubbed in often getting on the hands of the applicant. Very often the animals fur has to be groomed either before after or before and after the application of the pesticide requiring several tools to accomplish what could be better served with one time-saving tool.

U.S. Pat. No. 4,044,724 G. L. Merchill on Aug. 30, 1977 for a Grooming and Dispensing Brush Head describes a flat powder-dispensing brush head that has a plurality of bristles on a wall that has passageways therethrough. There is a powder-carrying handle connected to the brush head.

U.S. Pat. No. 4,237,822 to L. E. Kaiser, Jr. on Dec. 9, 1980 for an Animal Medication Brush shows a brush having a hollow body with a chamber for liquids and a hollow head detachably connected thereto. The hollow head has a plurality of hollow teeth attached. Liquid flow into the hollow head from the liquid chamber and through the hollow teeth onto the animal pelt being medicated. There is a manual pump to dispense the liquid.

U.S. Pat. No. 4,617,875 to L. L. Holland on Oct. 21, 1986 for a Grooming and Treatment Applicator describes a circular housing that will contain liquid or powder. It has a fiat circular face with multiple bristles thereon and with a plurality of openings therethrough. The housing has a strap attached to it to removably fasten the housing to the hand of the user. There is plate that moves a set of nozzles out of alignment with the openings in the fiat face to shut off the flow of the powder or liquid to the animal pelt.

The present invention allows the user to use one tool to both apply a pesticide and to groom the animal without reaching for several tools and with just a twist of a convenient cap saving time and animal discomfort.

SUMMARY OF THE INVENTION

Most domestic animals such as cats and dogs like to be brushed. Most owners have observed, however, that the same animals do not like to be sprayed or powdered. Aerosols especially frighten them. The present invention allows the pet owner to have a pleasant interaction with the animal and provide needed care, i.e., brushing/grooming with an application of a pesticide such as the application of flea powder to rid the animal of parasitic pests. With just one tool, the user can both apply the pesticide and groom the animal often without the animal becoming aware that the pesticide is being applied.

In a first embodiments, a pesticide dispensing and grooming brush is shown that has an inner tubular wall. There are a plurality of first ports through the inner tubular wall. The inner tubular wall forms an open-ended chamber. A filler cap is secured to a filler end of the inner tubular wall. There is an outer tubular wall rotatingly surrounding the inner tubular wall. The outer tubular wall has a plurality of second ports that extend through the outer tubular wall. A plurality of bristles are attached to and extend outwardly from the outer tubular wall.

The handle has a swivel member. A lower surface of the swivel member is attached to one end of the handle. The swivel member is swivelly or rotatingly connected to a swivel end of the inner tubular wall. There are a plurality of threads on the one end of the handle immediately below the swivel member. The anti-rotational cap is threadingly connected to a handle end of the outer tubular wall. The anti-rotational cap has a threaded handle port, in a cap wall of the cap, through which the plurality of threads on one end of the handle is threaded.

In a second embodiment, a pesticide dispensing and grooming brush is shown that has an inner tubular wall. There are a plurality of first ports through the inner tubular wall. The inner tubular wall forms an open-ended chamber. There is a locking filler cap unlockingly secured to a filler end of the inner tubular wall. The outer tubular wall rotatingly surrounds the inner tubular wall. The outer tubular wall has a plurality of second ports through the outer tubular wall. A plurality of bristles are attached to and extend outwardly from the outer tubular wall. There is a handle and a swivel member. A lower surface of the swivel member is attached to one end of the handle. The swivel member is swivelly or rotatingly connected to a swivel end of the inner tubular wall. There are a plurality of threads on the one end of the handle immediately below the swivel member. An anti-rotational cap is threadingly connected to a handle end of the outer tubular wall. The anti-rotational cap has a threaded handle port, in a cap wall of the cap, through which the plurality of threads on one end of the handle is threaded.

It is an object of this invention to provide a grooming brush that will, upon the loosening a tightening mechanism, allow a outer cylinder to rotate around an inner cylinder, alternatively aligning first and second port thereby distributing pesticide to the pelt of an animal and more specifically distributing flea powder.

BRIEF DESCRIPTION OF THE DRAWINGS

FIG. 3 is an exploded front elevational view of the Grooming and Dispensing Brush with a partial cut-away view inner tubular wall and a partial cut-away view of the anti-rotational cap.

FIG. 5 is a top plan view of the locking filler cap.

DESCRIPTION OF THE PREFERRED EMBODIMENTS

Figure 2:
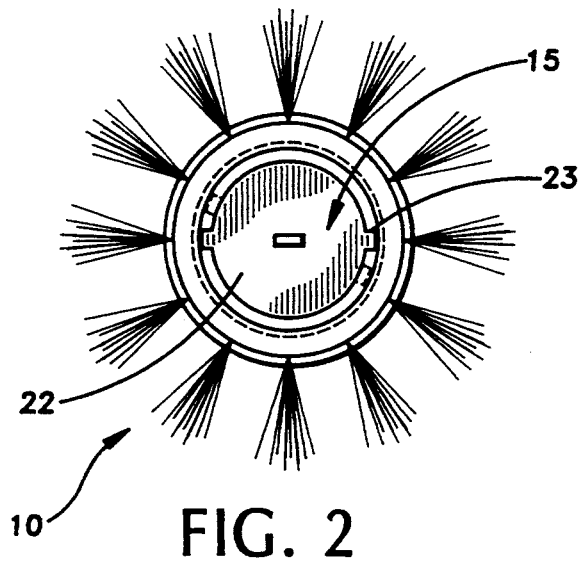
FIG. 2 is a top plan view of the Grooming and Dispensing Brush with the locking filler cap locked into the inner tubular wall.
Figure 4:
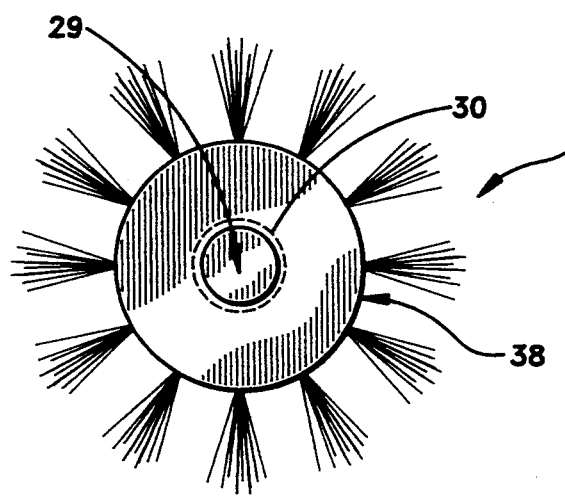
FIG. 4 is a bottom plan view of FIG. 1.
Figure 1:
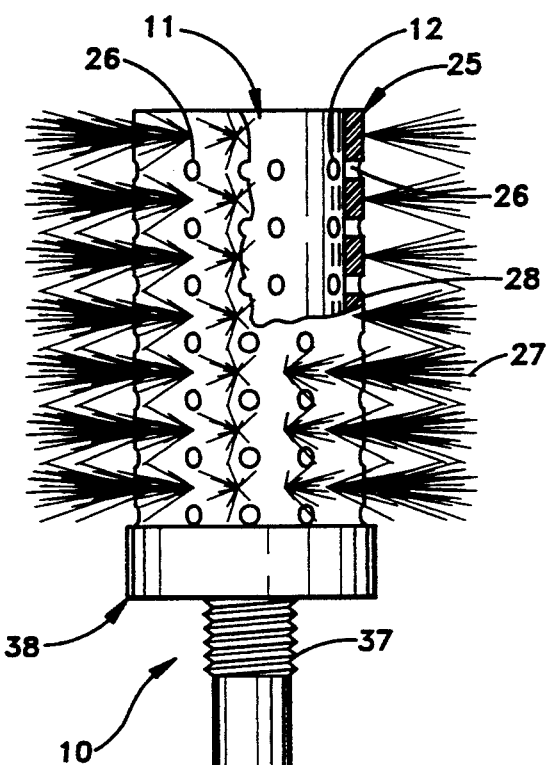
FIG. 1 is a front elevational view of a Grooming and Dispensing Brush with a partial cut-away view to show the second ports of the outer tubular wall.

Referring to FIGS. 1 through 5, a pesticide or other animal care product dispensing and grooming brush 10 is shown and described that has an inner tubular wall 11. The inner tubular wall I 1 has a plurality of first ports 12 through the inner tubular wall. The inner tubular wall 11 also forms an open-ended chamber 13, closed on a filler end 14 by the locking filler cap 15 and on the other end 18 by the lower wall 16 and the swivel member 17, to hold and dispense a pesticide (not shown). The locking filler cap 15 is unlockingly secured to the filler end 14 of the inner tubular wall 11. The locking filler cap 15 has a disc 19 and at least one locking lug 20 (preferably two) attached to the disc 19. An actuation lug 21 is attached to a top surface 22 of the disc 19 to assist in turning the disc and help to provide access to the chamber 13. The locking filler cap 15 is unlocked by grasping the actuation lug 21, turning the disc 19 until the locking lugs are aligned with the release slots 23 on the inner tubular wall 11 and lifting the locking filler cap free of the locking groove of 24 the inner tubular wall. Once the locking filler cap 15 is removed, pesticide can be placed in the chamber 13. Once the chamber is filled, the locking filter cap can be relocked onto the inner tubular wall 11.

There is an outer tubular wall 25 rotatingly surrounding the inner tubular wall 11. A plurality of second ports 26 extend through the outer tubular wall 25. There are a plurality of bristles 27 attached to and extending outwardly from the outer tubular wall 25. When the second ports 26 are aligned with the first ports 12, the pesticide or any other material in the chamber 13 can be dispensed from the chamber to the outer surface 28 of the outer tubular wall 25 onto the bristles 27 and onto the pelt of an animal. There is a handle 29 that has a swivel member 17. A lower surface 30 of the swivel member 17 is attached to one end 31 of the handle 29. The swivel member is swivelly or rotatingly connected to a swivel end 32 of the inner tubular wall 11. The swivel member 17 extends through a lower chamber port 33 in a lower chamber wall 34 connected to the inner tubular wall 11. A lip 35 on the lower chamber wall 34 (formed by the lower chamber port 33) extends into a swivel groove 36 in the swivel member 17. There are a plurality of threads 37 on the one end 31 of the handle 29 immediately below the swivel member 17. An anti-rotational cap 38 is threadingly connected to a handle end 39 of the outer tubular wall 25. The anti-rotational cap 38 has a threaded handle port 40, in a cap wall 41 of the anti-rotational cap through which the plurality of threads 37 on one end of the handle 31 is threaded. Tightening the anti-rotational cap snugly up against the inner tubular wall 11 and the outer tubular wall 25 increases the effort needed to align the first ports 12 with the second ports 26 as required to allow the pesticide to flow from the chamber 13 to the outer surface 28 of the outer tubular wall 25. The user may remove the inner tubular wall 11 by partially unscrewing the anti-rotational cap 38 down the handle 29 via the threads 37 just below the swivel member 17 and then unscrewing outer tubular wall 25 from the anti-rotational cap 38. The anti-rotational cap may be removed from the handle 29, if desired, by unscrewing the cap 38 completely off the threads 37 on the handle and pulling the cap 38 from the end 42 of the handle distal the swivel member 17.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A pesticide dispensing and grooming brush comprising:
   (a) an inner tubular wall comprising:
      a plurality of first ports through the inner tubular wall; and
      the inner tubular wall forming an open-ended chamber;
   (b) a filler cap secured to a filler end of the inner tubular wall;
   (c) an outer tubular wall rotatingly surrounding the inner tubular wall comprising:
      a plurality of second ports through the outer tubular wall; and
      a plurality of bristles attached to and extending outwardly from the outer tubular wall;
   (d) a handle comprising:
      a swivel member;
      a lower surface of the swivel member attached to one end of the handle;
      the swivel member swivelly connected to a swivel end of the inner tubular wall; and
      a plurality of threads on the one end of the handle immediately below the swivel member; and
   (e) an anti-rotational cap threadingly connected to a handle end of the outer tubular wall comprising a threaded handle port, in a cap wall of the anti-rotational cap through which the plurality of threads on one end of the handle is threaded.

2. A pesticide dispensing and grooming brush comprising:
   (a) an inner tubular wall comprising:
      a plurality of first ports through the inner tubular wall; and
      the inner tubular wall forming an open-ended chamber;
   (b) a locking filler cap unlockingly secured to a filler end of the inner tubular wall;
   (c) an outer tubular wall rotatingly surrounding the inner tubular wall comprising:
      a plurality of second ports through the outer tubular wall; and
      a plurality of bristles attached to and extending outwardly from the outer tubular wall;
   (d) a handle comprising:
      a swivel member;
      a lower surface of the swivel member attached to one end of the handle;
      the swivel member swivelly connected to a swivel end of the inner tubular wall; and
      a plurality of threads on the one end of the handle immediately below the swivel member; and
   (e) an anti-rotational cap threadingly connected to a handle end of the outer tubular wall comprising a threaded handle port, in a cap wall of the anti-rotational cap through which the plurality of threads on one end of the handle is threaded.

3. A pesticide dispensing and grooming brush comprising:
   (a) an inner tubular wall comprising:
      a plurality of first ports through the inner tubular wall; and
      the inner tubular wall forming an open-ended chamber;
   (b) a locking filler cap unlockingly secured to a filler end of the inner tubular wall comprising:
      a disc;
      at least one locking lug attached to the disc; and
      an actuation lug attached to a top surface of the disc;

(c) an outer tubular wall rotatingly surrounding the inner tubular wail comprising:
   a plurality of second ports through the outer tubular wall; and
   a plurality of bristles attached to and extending outwardly from the outer tubular wall;
(d) a handle comprising:
   a swivel member;
   a lower surface of the swivel member attached to one end of the handle;
   the swivel member swivelly connected to a swivel end of the inner tubular wall; and
   a plurality of threads on the one end of the handle immediately below the swivel member; and
(e) an anti-rotational cap threadingly connected to a handle end of the outer tubular wall comprising a threaded handle port, in a cap wall of the anti-rotational cap through which the plurality of threads on one end of the handle is threaded.

* * * * *